US011527976B2

(12) United States Patent
Vanevenhoven et al.

(10) Patent No.: US 11,527,976 B2
(45) Date of Patent: Dec. 13, 2022

(54) AC BUS TIE CONTACTOR INPUT INTO RAT AUTO-DEPLOY

(71) Applicant: Hamilton Sundstrand Corporation, Charlotte, NC (US)

(72) Inventors: Jordan K. Vanevenhoven, Rockford, IL (US); Jeffrey D. Myroth, Roscoe, IL (US); Shane R. Traser, Rockford, IL (US); Jef William Good, German Valley, IL (US); John N. Buzzard, Rockford, IL (US); Kyle Stephen Ives, Loves Park, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 17/315,597

(22) Filed: May 10, 2021

(65) Prior Publication Data
US 2021/0297025 A1    Sep. 23, 2021

Related U.S. Application Data

(63) Continuation of application No. 16/821,234, filed on Mar. 17, 2020, now Pat. No. 11,108,349.

(51) Int. Cl.
*H02P 9/04* (2006.01)
*F03D 15/00* (2016.01)
(Continued)

(52) U.S. Cl.
CPC .............. *H02P 9/04* (2013.01); *B64D 41/007* (2013.01); *F03D 15/00* (2016.05);
(Continued)

(58) Field of Classification Search
CPC .... H02P 9/04; H02P 2101/15; H02P 2101/30; B64D 41/007; B64D 2221/00;
(Continued)

(56) References Cited

U.S. PATENT DOCUMENTS 8,892,265 B2    11/2014 Swearingen et al.
10,029,631 B2    7/2018 Iwashima et al.
(Continued)

FOREIGN PATENT DOCUMENTS

EP    3543143 A1    9/2019

OTHER PUBLICATIONS

Extended European Search Report dated Aug. 23, 2021, issued during the prosecution of European Patent Application No. 21163223.7.

*Primary Examiner* — Joseph Ortega
(74) *Attorney, Agent, or Firm* — Locke Lord LLP; Joshua L. Jones; Scott D. Wofsy

(57) ABSTRACT

A system includes a first AC bus configured to supply power from a first generator. A first generator line contactor (GLC) selectively connects the first AC bus to the first generator. A second AC bus is configured to supply power from a second generator. A second GLC selectively connecting the second AC bus to the second generator. An auxiliary generator line contactor (ALC) is connected to selectively supply power to the first and second AC buses from an auxiliary generator. A first bus tie contactor (BTC) electrically connects between the first GLC and the ALC. A second BTC electrically connects between the ALC and the second GLC. A ram air turbine (RAT) automatic deployment controller is operatively connected to automatically deploy a RAT based on the combined status of the first GLC, the second GLC, the ALC, the first BTC, and the second BTC.

13 Claims, 2 Drawing Sheets

(51) Int. Cl.
  *B64D 41/00* (2006.01)
  *H02P 101/15* (2016.01)
  *H02P 101/30* (2015.01)

(52) U.S. Cl.
  CPC ...... *B64D 2221/00* (2013.01); *H02P 2101/15* (2015.01); *H02P 2101/30* (2015.01)

(58) Field of Classification Search
  CPC ........ F03D 15/00; Y02E 10/72; H02J 3/0073; H02J 3/04; H02J 9/068
  See application file for complete search history.

(56) References Cited

U.S. PATENT DOCUMENTS

| | | |
|---|---|---|
| 10,493,930 B2 | 12/2019 | Shander et al. |
| 2012/0245746 A1* | 9/2012 | Swearingen ......... B64D 41/007 700/287 |
| 2013/0214589 A1 | 8/2013 | Swearingen et al. |
| 2014/0008488 A1* | 1/2014 | Buzzard ................ B64D 41/00 244/50 |
| 2014/0125121 A1* | 5/2014 | Edwards ............... H02J 7/1446 307/9.1 |
| 2015/0183385 A1* | 7/2015 | Iwashima .............. B60L 53/00 307/9.1 |

* cited by examiner

AC BUS TIE CONTACTOR INPUT INTO RAT AUTO-DEPLOY

CROSS-REFERENCE TO RELATED APPLICATIONS

This application claims priority to U.S. patent application Ser. No. 16/821,234 filed Mar. 17, 2020 the contents of which are incorporated by reference herein in their entirety.

BACKGROUND

1. Field

The present disclosure relates to power distribution systems, and more particularly to AC essential busses such as used in aerospace applications.

2. Description of Related Art

Traditionally, ram air turbine (RAT) automatic deployment (auto-deploy) has been performed based on generator line contactor status. This does not take into consideration system configurations when a generator source may be online but not providing power to any AC bus. This can ultimately rely on airmanship to recognize the condition and manually deploy the RAT.

The conventional techniques have been considered satisfactory for their intended purpose. However, there is an ever present need for improved systems and methods for power distribution. This disclosure provides a solution for this need.

SUMMARY

A system includes a first AC bus configured to supply power from a first generator. A first generator line contactor (GLC) selectively connects the first AC bus to the first generator. A second AC bus is configured to supply power from a second generator. A second GLC selectively connecting the second AC bus to the second generator. An auxiliary generator line contactor (ALC) is connected to selectively supply power to the first and second AC buses from an auxiliary generator. A first bus tie contactor (BTC) electrically connects between the first GLC and the ALC. A second BTC electrically connects between the ALC and the second GLC. A ram air turbine (RAT) automatic deployment controller is operatively connected to the first GLC, the second GLC, the ALC, the first BTC, and the second BTC to automatically deploy a RAT based on the combined status of the first GLC, the second GLC, the ALC, the first BTC, and the second BTC.

The RAT automatic deployment controller can be configured to deploy the RAT only if the first BTC and second BTC are both open or the ALC is open and the first GLC and the second GLC are both open. A first GLC auxiliary status contact can be connected to provide status of the first GLC to the RAT automatic deployment controller. A second GLC auxiliary status contact can be connected to provide status of the second GLC to the RAT automatic deployment controller. An ALC auxiliary status contact can be connected to provide status of the ALC to the RAT automatic deployment controller. A first BTC auxiliary status contact can be connected to provide status of the first BTC to the RAT automatic deployment controller. A second BTC auxiliary status contact can be connected to provide status of the second BTC to the RAT automatic deployment controller.

The first and second GLC auxiliary status contacts, the ALC auxiliary status contact, and the first and second BTC auxiliary status contacts can all be connected to the RAT automatic deployment controller individually. The first and second GLC auxiliary status contacts can be connected to the RAT automatic deployment controller in series with one another and can be connected in series with the ALC auxiliary status contact, wherein the first and second BTC auxiliary status contacts are connected in series with each other and are connected in parallel with the ALC auxiliary status contact.

The RAT automatic deployment controller can be configured to deploy the RAT only if the following logical condition is met: an air mode is detected for an aircraft onboard which the RAT is located; the first GLC is open; the second GLC is open; and the ALC is open OR the first and second BTC's are both open.

The first and second generators can be respectively connected to the first and second GLC's. The RAT can be operatively connected to be controlled for automatic deployment by the RAT automatic deployment controller.

A method of distributing power includes supplying power to at least one of a first AC bus and a second AC bus from at least one of a first generator, a second generator and/or an auxiliary generator. The method includes automatically deploying a ram air turbine (RAT) if the first and second AC buses are powered off.

Automatically deploying the RAT can include automatically deploying the RAT when the auxiliary generator is available to provide power but is not connected to either of the first or second AC buses. Automatically deploying the RAT can include not having a human user deploy the RAT. Automatically deploying the RAT can be performed, for example, only if the RAT is onboard an aircraft in flight. Automatically deploying the RAT can be performed, for example, only if the first and second GLC's are open and a first bus tie contactor (BTC) a second BTC are both open or an auxiliary generator line contactor (ALC) is open.

Automatically deploying the RAT can be performed, for example, only if the following logical condition is met: an air mode is detected for an aircraft onboard which the RAT is located; a first generator line contactor (GLC) selectively connecting the first AC bus to the first generator is open; a second GLC selectively connecting the second AC bus to the second generator is open; and the ALC is open OR the first and second BTC's are both open.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
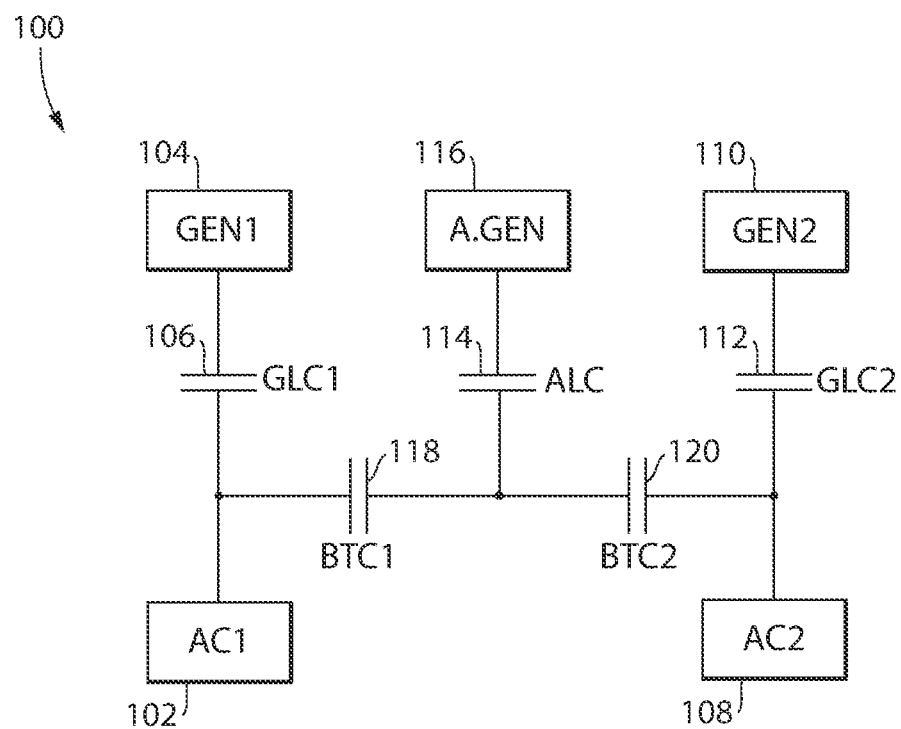
FIG. 1 is a schematic view of an embodiment of a system constructed in accordance with the present disclosure, showing the generators, buses, and contactors.

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. Other embodiments of systems in accordance with the disclosure, or aspects thereof, are provided in FIGS. 2-4, as will be described. The systems and methods described herein can be used to allow for automatic deployment of a ram air turbine (RAT) when a primary power source is online but not powering any loads, reducing the need to rely on airmanship to recognize the condition and manually deploy the RAT.

The system 100 includes a first AC bus 102 configured to supply power from a first generator 104. A first generator line contactor (GLC) 106 selectively connects the first AC bus 102 to the first generator 104. A second AC bus 108 is configured to supply power from a second generator 110. A second GLC 112 selectively connects the second AC bus 108 to the second generator 110. An auxiliary generator line contactor (ALC) 114 is connected to selectively supply power to the first and second AC buses 102, 108 from an auxiliary generator 116. A first bus tie contactor (BTC) 118 electrically connects between the first GLC 106 and the ALC 114. A second BTC 120 electrically connects between the ALC 114 and the second GLC 112. Contactor auxiliary statuses described below operatively connect a ram air turbine (RAT) automatic deployment controller 122 to the first GLC 106, the second GLC 112, the ALC 114, the first BTC 118, and the second BTC 120 to automatically deploy a RAT 124 (indicated in FIGS. 2-3) based on the combined status of the first GLC 106, the second GLC 112, the ALC 114, the first BTC 118, and the second BTC 120. The RAT automatic deployment controller 122 can be configured to deploy the RAT if the first GLC 106 and the second GLC 112 are both open, and either the ALC 114 is open or both the first BTC 118 and second BTC 120 are both open.

Figure 2:
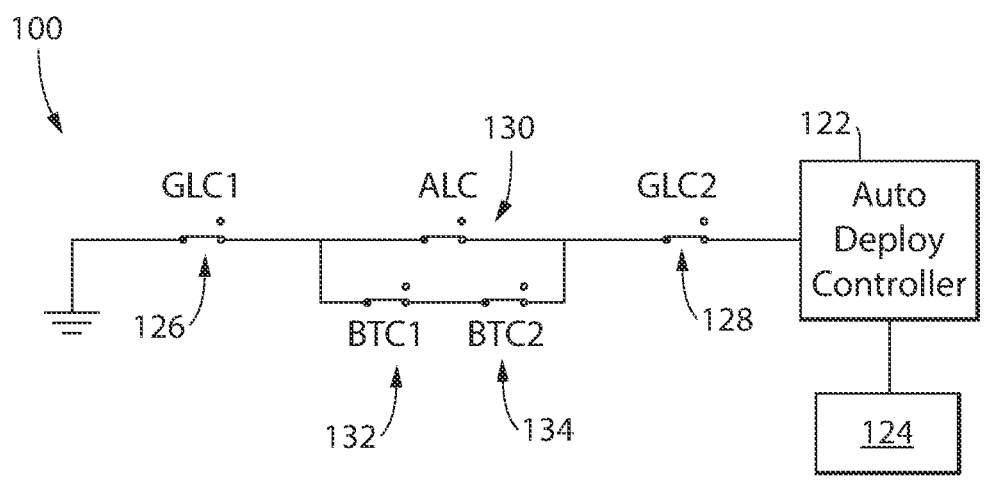
FIG. 2 is a schematic view of a portion of the system of FIG. 1, showing the auxiliary statuses connecting in a first configuration.

With reference now to FIG. 2, a first GLC auxiliary status contact 126 can be connected to provide status of the first GLC 106 to the RAT automatic deployment controller 122. A second GLC auxiliary status contact 128 can be connected to provide status of the second GLC 112 to the RAT automatic deployment controller 122. An ALC auxiliary status contact 130 can be connected to provide status of the ALC 114 to the RAT automatic deployment controller 122. A first BTC auxiliary status contact 132 can be connected to provide status of the first BTC 118 to the RAT automatic deployment controller 122. A second BTC auxiliary status contact 134 can be connected to provide status of the second BTC 120 to the RAT automatic deployment controller 122.

Figure 3:
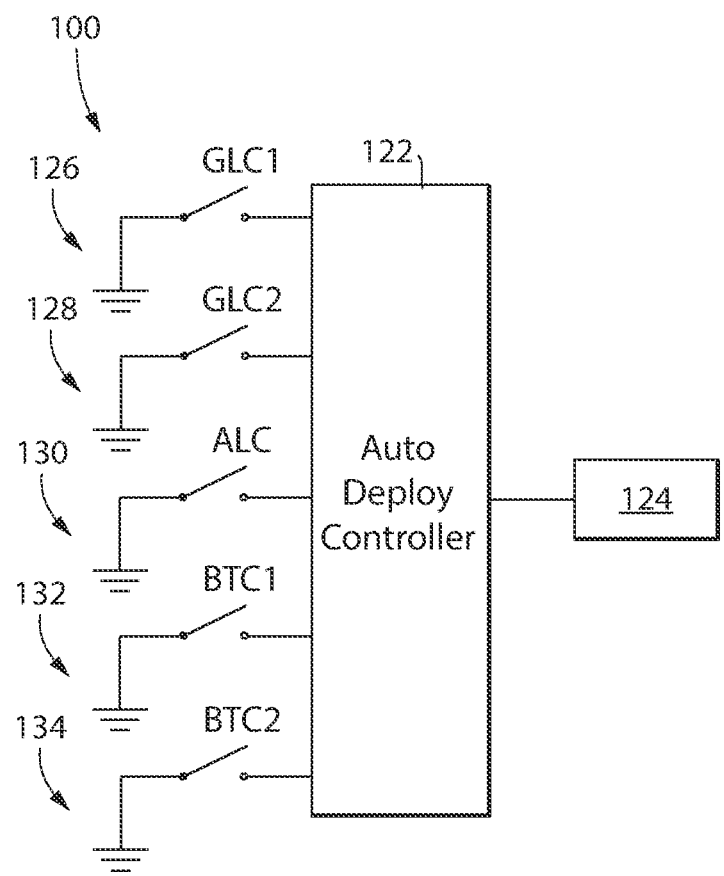
FIG. 3 is a schematic view of a portion of the system of FIG. 1, showing the auxiliary statuses connecting in a second configuration.
Figure 4:
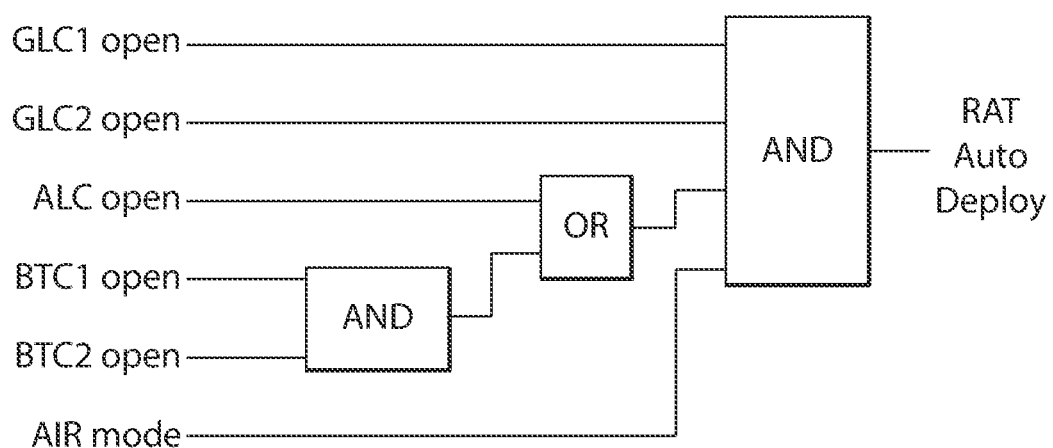
FIG. 4 is a schematic view of logic for controlling the system of FIG. 1.

With continued reference to FIG. 2, the first and second GLC auxiliary status contacts 126,128 can be connected to the RAT automatic deployment controller 122 in series with one another and can be connected in series with the ALC auxiliary status contact 130. The first and second BTC auxiliary status contacts 132, 134 are connected in series with each other and are connected in parallel with the ALC auxiliary status contact 130. This configuration inherently provides the logic shown schematically in FIG. 4. It is also contemplated that the first and second GLC auxiliary status contacts 126, 128, the ALC auxiliary status contact 130, and the first and second BTC auxiliary status contacts 132, 134 can all be connected to the RAT automatic deployment controller 122 to be sensed individually, as shown in FIG. 3, wherein the logic schematically shown in FIG. 4 is embedded or programed. As indicated in FIG. 4, under either the configuration of FIG. 2 or FIG. 3, the RAT automatic deployment controller 122 is configured to deploy the RAT 124 only if the following logical condition is met: an air mode is detected for an aircraft onboard which the RAT 124 is located; the first GLC 106 is open; the second GLC is open 128; and the ALC 114 is open OR the first and second BTC's 132, 134 are both open.

A method of distributing power includes supplying power to at least one of a first AC bus 102 and a second AC bus 108 from at least one of a first generator 104, a second generator 110 and/or an auxiliary generator 116. The method includes automatically deploying a RAT 124 if the first and second GLC's 106, 112 are powered off.

Automatically deploying the RAT 124 even if the auxiliary generator 116 is online can include automatically deploying the RAT 124 when the auxiliary generator 116 is available to provide power but is not connected to either of the first or second AC buses 102, 108. Automatically deploying the RAT 124 can include not having a human user deploy the RAT 124. Automatically deploying the RAT 124 can be performed, for example, only if the RAT 124 is onboard an aircraft in flight. Automatically deploying the RAT 124 can be performed, for example, only if a first BTC 118 and a second BTC 120 are both open or an ALC 114 is open, and both a first GLC 106 and a second GLC 128 are open.

Automatically deploying the RAT 124 can be performed, for example, only if the following logical condition is met: an air mode is detected for an aircraft onboard which the RAT 124 is located; a first GLC 106 selectively connecting the first AC bus 102 to the first generator 104 is open; a second GLC 112 selectively connecting the second AC bus 108 to the second generator 110 is open; and the ALC 114 is open OR the first and second BTC's 118, 120 are both open.

The methods and systems of the present disclosure, as described above and shown in the drawings, allow for automatic deployment of a ram air turbine (RAT) when a primary power source is online but not powering any loads, reducing the need to rely on airmanship to recognize the condition and manually deploy the RAT. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A system comprising:
   a first AC bus configured to supply power from a first generator;
   a first generator line contactor (GLC) selectively connecting the first AC bus to the first generator;
   a second AC bus configured to supply power from a second generator;
   a second GLC selectively connecting the second AC bus to the second generator;
   an auxiliary generator line contactor (ALC) connected to selectively supply power to the first and second AC buses from an auxiliary generator;
   a first bus tie contactor (BTC) electrically connecting between the first GLC and the ALC;
   a second BTC electrically connecting between the ALC and the second GLC; and a ram air turbine (RAT) automatic deployment controller operatively connected to the first GLC, the second GLC, the ALC, the first BTC, and the second BTC to automatically deploy a RAT based on the combined status of the first GLC, the second GLC, the ALC, the first BTC, and the second BTC, a first GLC auxiliary status contact connected to provide status of the first GLC to the RAT automatic deployment controller;

a second GLC auxiliary status contact connected to provide status of the second GLC to the RAT automatic deployment controller;

an ALC auxiliary status contact connected to provide status of the ALC to the RAT automatic deployment controller;

a first BTC auxiliary status contact connected to provide status of the first BTC to the RAT automatic deployment controller; and a second BTC auxiliary status contact connected to provide status of the second BTC to the RAT automatic deployment controller;

wherein the first GLC status and the second GLC status are connected in parallel to the RAT Auto Deployment controller;

wherein the RAT automatic deployment controller is configured to deploy the RAT when the following condition is met: the first GLC status contact and the second GLC status contact are both open; the ALC status contact is open; the first BTC status contact and second BTC status contact are both open; and an air mode is detected for an aircraft onboard which the RAT is located; further comprising:

wherein the ALC status contact is connected in parallel to the first BTC status contact and second BTC status contact; wherein the parallel connected ALC status contact, first/second BTC status contacts are connected to the RAT Auto Deployment controller;

wherein the air mode detected is connected to the RAT Auto Deployment Controller; and wherein the first GLC status contact, the second GLC status contact, the parallel connected ALC, first/second BTC status contacts and the air mode are all connected in parallel to the RAT Auto Deployment Controller.

2. The system as recited in claim 1, wherein the first and second GLC auxiliary status contacts, the ALC auxiliary status contact, and the first and second BTC auxiliary status contacts are all connected to the RAT automatic deployment controller individually.

3. The system as recited in claim 1, wherein the RAT automatic deployment controller is configured to deploy the RAT only if
an air mode is detected for an aircraft onboard which the RAT is located.

4. The system as recited in claim 1, further comprising the first and second generators respectively connected to the first and second GLC's.

5. The system as recited in claim 4, further comprising the auxiliary generator connected to the ALC.

6. The system as recited in claim 1, further comprising the RAT operatively connected to be controlled for automatic deployment by the RAT automatic deployment controller.

7. A method of distributing power comprising:
supplying power to at least one of a first AC bus and a second AC bus from at least one of a first generator, a second generator and/or an auxiliary generator; and wherein a RAT automatic deployment controller is configured to deploy a RAT when the following condition is met: a first GLC status contact and a second GLC status contact are both open; an ALC status contact is open; a first BTC status contact and a second BTC status contact are both open; and an air mode is detected for an aircraft onboard which the RAT is located; further comprising:

a first GLC auxiliary status contact connected to provide status of the first GLC to the RAT automatic deployment controller;

a second GLC auxiliary status contact connected to provide status of the second GLC to the RAT automatic deployment controller;

an ALC auxiliary status contact connected to provide status of the ALC to the RAT automatic deployment controller;

a first BTC auxiliary status contact connected to provide status of the first BTC to the RAT automatic deployment controller; and a second BTC auxiliary status contact connected to provide status of the second BTC to the RAT automatic deployment controller;

wherein the first GLC status contact and the second GLC status contact are connected in parallel to the RAT Auto Deployment controller;

wherein the ALC status contact is connected in parallel to the first BTC status contact and second BTC status contact; wherein the parallel connected ALC, first/second BTC status contacts are connected to the RAT Auto Deployment controller;

wherein the air mode detected is connected to the RAT Auto Deployment Controller; and wherein the first GLC status contact, the second GLC status contact, the parallel connected ALC contact, first/second BTC status contacts and the air mode are all connected in parallel to the RAT Auto Deployment Controller.

8. The method as recited in claim 7, wherein automatically deploying the RAT includes automatically deploying the RAT when the auxiliary generator is available to provide power but is not connected to either of the first or second AC buses.

9. The method as recited in claim 7, wherein automatically deploying the RAT includes not having a human user deploy the RAT.

10. The method as recited in claim 7, wherein automatically deploying the RAT is only performed if the RAT is onboard an aircraft in flight.

11. The method as recited in claim 10, wherein automatically deploying the RAT is performed only if
an air mode is detected for an aircraft onboard which the RAT is located.

12. The system as recited in claim 1, further comprising the RAT auto deploy controller will deploy if the ALC status contact is open.

13. The system as recited in claim 1, further comprising the RAT auto deploy controller will deploy if the ALC status contact is open and if both first BTC status and second BTC status contacts are connected, the RAT Auto deployment Controller will not deploy the RAT unless at least one of the first GLC status and second GLC status are open.

* * * * *